3,123,327
HELICOPTER ROTOR ICE DETECTOR
Joseph Edward Padgett, Jr., Springfield, Va., assignor to Parsons Corporation, Traverse City, Mich., a corporation of Michigan
Filed May 10, 1961, Ser. No. 109,138
7 Claims. (Cl. 244—134)

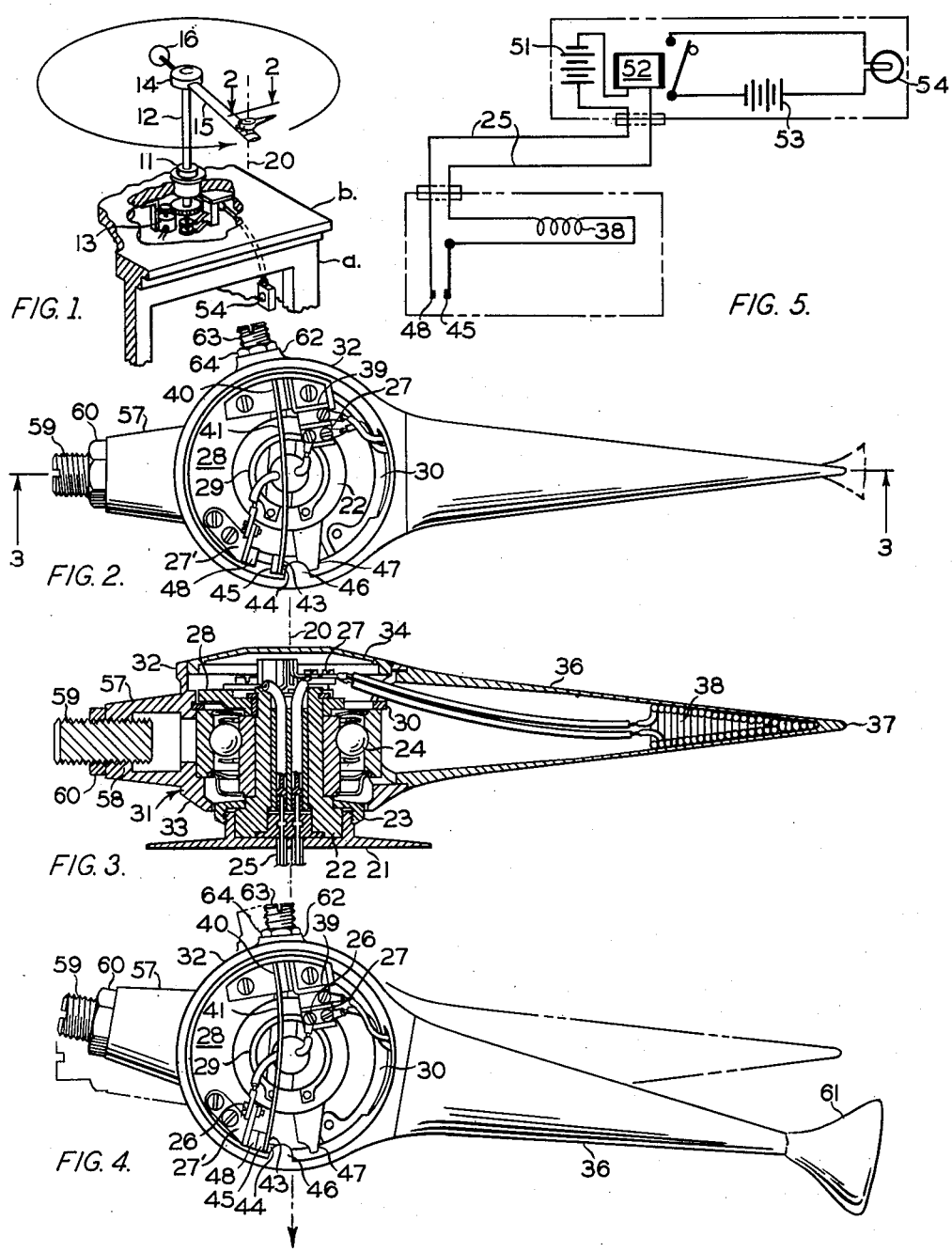
March 3, 1964 — J. E. PADGETT, JR — 3,123,327
HELICOPTER ROTOR ICE DETECTOR
Filed May 10, 1961 — 2 Sheets-Sheet 1
INVENTOR
JOSEPH EDWARD PADGETT, JR.
BY
HIS ATTORNEY March 3, 1964
J. E. PADGETT, JR
3,123,327
HELICOPTER ROTOR ICE DETECTOR
Filed May 10, 1961
2 Sheets-Sheet 2
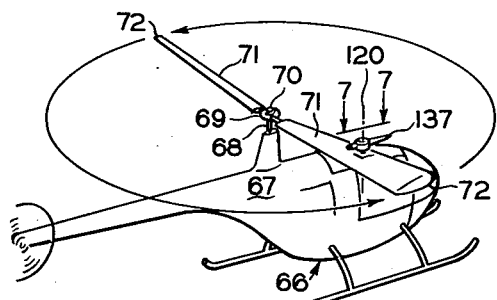
FIG. 6.
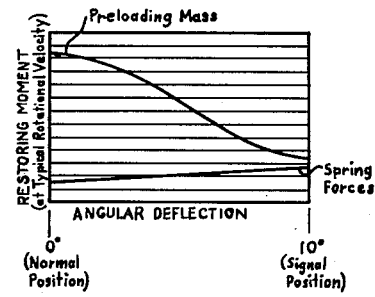
FIG. 10.
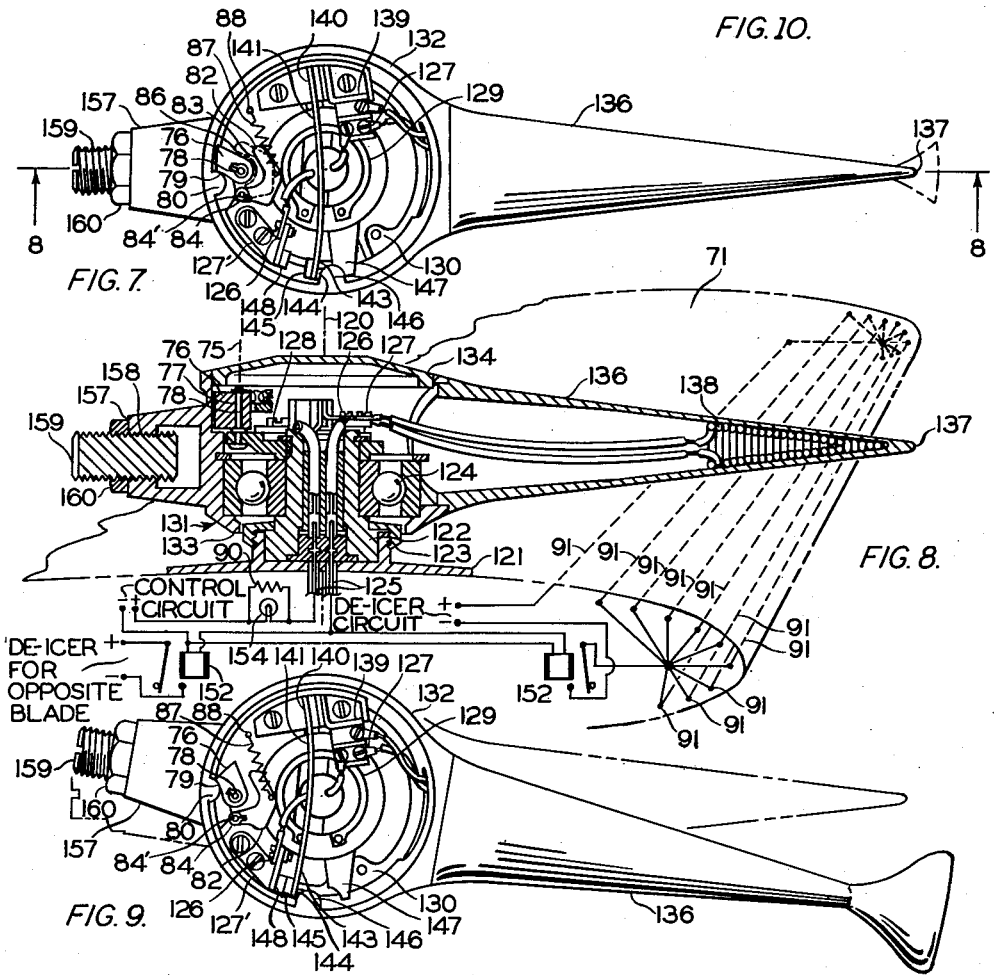
INVENTOR
JOSEPH EDWARD PADGETT, JR.
BY *Jerome A. Graw*
HIS ATTORNEY United States Patent Office 3,123,327
Patented Mar. 3, 1964

The present invention relates to the de-icing of rotary wing aircraft, particularly helicopters, and provides both a reliable indicator for the onset of icing conditions and for automatic de-icing, not only of the detector but of the rotor system itself.

This application is a continuation in part of my co-pending application entitled "Device for Signalling the Presence of Atmospheric Icing Conditions," Serial No. 80,100 filed January 3, 1961. That application shows the utilization of a pointed ice-accreting member pivotally mounted for limited angular movement on an arm rotating in a horizontal plane at constant velocity, such as might be used on ground weather stations, on weather ships, and on fixed-wing aircraft. In the present application, a somewhat similar device is mounted on one of the rotor blades so that the centrifugal forces which actuate it are supplied by the rotor system itself.

The blades of rotary wing aircraft do not turn at constant angular velocity. They may operate over a wide range of angular speed; and even within a single cycle are subject to leading and lagging relative to the hub. The resulting accelerations and decelerations cause fluctuations in centrifugal forces. It is important that despite such fluctuations, the system be operated unfailingly by the accretion of ice, once its mass exceeds a precisely pre-determined minimum. The present invention discriminates against the effects of rotational speed, acceleration and decleration and the presence or absence of less than such pre-determined minimum amount of ice. The device used employs a pre-loading mass, not supported by the angularly movable ice-accreting member but which bears against it to urge it angularly in a sense opposite to that sense in which the accreting ice tends to move it. It will signal the onset of icing conditions, de-ice itself, indicate rate of icing, be free of false signals; and where desired, automatically controls the operation of a de-icing system for the blade and other de-icing systems as well, if desired.

As used on a helicopter rotor blade, the present device, in its preferred embodiment, provides a tapering, ice-collector pivot mounted on the blade well outboard of the hub, and balanced on the pivot against centrifugal forces so as normally to present the tapering member in the direction of travel of the blade. It is adapted to collect ice out of the atmosphere, the locus of ice accretion being forward of the pivot. The centrifugal force of accreted ice will cause overbalance, and resulting angular movement, which operates an electrical switch or other circuit-making means. This places in circuit a de-icer within the forward end of the ice-accreting member, an electrically-operated blade de-icer, a cockpit signal and/or other systems and instrumentation.

A movable mass carried by the blade but not so pivotally mounted, acts on the pivot-mounted assembly in the sense opposite to the accreting ice and constitutes a pre-load, in the sense that the centrifugal force of blade rotation acts on it also. Until the moment exerted by the accreting ice exceeds the moment of such pre-loading mass, the centrifugal force acting on such mass will so bear against the ice-accreting member as to hold it in its normal, forwardly-presented position. A spring-latch engages when the rotor is stopped or moving slowly, to hold the member in such forward position, but at increased speed the centrifugal force on the latch mass disengages it to permit operation of the device.

Such a preferred embodiment is described in detail later in this specification.

The preferred embodiment hereinafter described is essentially a switch device mounted on the helicopter rotor blade which serves as a rotating arm, moving the device in a curved path lying substantially within a plane so as to impose centrifugal forces on it. These are present, whether the helicopter is hovering or moving forward. It comprises a mounting including a pivot which permits angular movement substantially within the plane, a housing mounted on the pivot, and means projecting from the housing and spaced from the pivot, the housing and such projecting means being counterbalanced against such centrifugal forces but subject to being unbalanced by the application of an unbalancing force, such as accreting ice, on the means which project from the housing.

A switch within the housing has a contact which moves, with the housing, angularly about the pivot; and by such movement establishes a switch-open position and a switch-closed position. One of said switch positions (normally, the switch-off position) corresponds to the position of the housing and its projecting means when not deflected by such an unbalancing force; the other position of the switch is that which the pivot housing and its projecting means assume when the unbalancing force deflects them angularly about the pivot.

A unique feature of the present switch device is the provision of a pre-loading mass, which bears resistingly against the housing to urge it angularly and by such urging to exert against it a turning or twisting moment opposite in sense to the moment of the anticipated unbalancing force such as is applied to the projecting means by accreting ice. When the housing is in undeflected position, such resisting moment is of a pre-determined magnitude, chosen to equal the mass moment on the projecting member of a quantity of accreted ice in less than the minimum which is intended to bring the device into operation. When the accreted ice exceeds the minimum and turns the housing to deflected position, the angular deflection itself substantially lessens the moment of the pre-loading mass; so that until the accreted ice is dislodged or almost completely melted, the housing will remain in its deflected position.

The invention described in said co-pending application is illustrated in FIGURES 1 to 5 of the accompanying drawings, in which:

FIGURE 1 is a schematic perspective view of a detection device for icing conditions, mounted onto the roof of an observer's cabin.

FIGURE 2 is a plan view of the detector mechanism as seen along line 2—2 of FIGURE 1, with its housing cap removed.

FIGURE 3 is a sectional view taken along line 3—3 of FIGURE 2.

FIGURE 4 is a view corresponding to FIGURE 2, with an amount of ice accreted thereon sufficient, under the centrifugal force indicated by the arrow, to deflect the housing from its original position shown in phantom lines to the deflected position shown in solid lines.

FIGURE 5 is a simplified wiring diagram showing, in the upper rectangle, the elements within the observer's cabin, and in the lower rectangle, the rotating elements.

The type of installation depicted in FIGURE 1 shows, fragmentarily, an observer's cabin, generally designated a. The cabin roof b has a sealed bushing 11 which supports a vertical, rotatable, hollow mast 12 powered, from a source of electricity not shown, by a geared motor 13. The mast 12 extends upward sufficiently above the roof b to extend into the relatively free air stream.

A hub 14 at the top of the mast 12 mounts a rotatable hollow arm 15 which preferably extends radially and is quite rigid. The arm 15 may have a 180° counterweight as at 16.

Located on the arm 15 outward from the center of rotation of the mast 12 and hub 14, is a pivot axis 20 as shown in FIGURES 1 and 3, essentially transverse to the horizontal plane of rotation. Its distance from the center of rotation of the hub 14 is selected to provide a desired tangential velocity under the preferably constant speed of rotation of the mast 12. In the specific embodiment shown, the axis 20 is established by a mounting flange 21 secured onto the rotatable arm 15. Extending vertically upward is a hollow spindle pivot 22, fastened fixedly within the mounting flange 21 by a mounting nut 23 as shown in FIGURE 3. A bearing, such as the ball bearing assembly 24, is mounted rotatably on the pivot 22 to permit angular movement, in a plane substantially parallel to the plane of rotation of the arm 15. Through the hollow spindle of the pivot 22 are drawn the electric leads 25, which pass through the arm 15 and mast 12 to the observer's cabin *a* as hereinafter described. From the upper end of the pivot 22, these leads 25 continue to terminals 26 secured to conductive terminal posts 27, 27', which are mounted on a fixed platform 28 keyed onto the upper end of the pivot 22, as by a snap ring 29.

Onto the outer race of the bearing 24 is mounted, by a larger snap ring 30, a rotatable housing generally designated 31. It comprises a housing body 32 of nearly cylindrical form as shown in FIGURES 2 and 4, having a lower circular flange 33 which overhangs the mounting nut 23 with clearance so as to avoid binding by the formation of ice. The upper end of the housing body 32 is equipped with a circular cap 34, shown in place in FIGURE 3 but removed in both FIGURES 2 and 4.

Projecting from the forward side of the housing body 32 is a conical-tapering, hollow, ice-accreting member 36 which has a closed, forwardly-projecting point 37. The wall of the hollow ice-accreting member 36 near its point 37 is sufficiently thin and heat-conductive (such as metal) as to permit de-icing by an electrical resistance heater 38 contained within it. The heater 38 may consist of a simple resistance wire twisted into a conical loop as shown in FIGURE 3, with one lead joining the terminal post 27, and the other lead connected to a spring-base terminal post 39, screwed or otherwise mounted onto the fixed platform 28.

Secured to the terminal post 39 by its base end 40, and extending horizontally across the platform 28 above the top of the pivot 22, is a leaf spring designated 41, formed of electrically-conductive metal. It is positioned vertically edgewise, so that it may flex in the horizontal plane. It is electrically conductive from its base end 40, where it joins the terminal post 39, to its contact end 43, where it is fitted on the forward side with a bumper 44 and on its aft side with an electrical contact 45. A vertical ridge 46 formed on the inner side of the housing body 32 and shown as semi-circular, bears against the spring's bumper 44; and bends the spring 41 backward to the slightly-flexed position shown in FIGURE 2 when the point 37 extends straight forward. Movement of the point 37 inward of this position is prevented by contact of the ridge 46 against a stop blade 47 which extends radially outward from the platform 28. The flexural resistance of the spring 41 increases when, as hereinafter described, the housing 31 is moved by centrifugal force from the position shown in FIGURE 2, in which the electrical contact 45 is open, to the position shown in FIGURE 4, in which the electrical contact 45 is closed against a fixed electrical contact 48 supported on the terminal post 27. The angular movement of the housing 31 is thus limited by two stops: the fixed electrical contact 48 and the stop blade 47.

When the circuit is wired as illustrated in FIGURE 5, current from an electric power source (indicated generally as a storage battery 51) passes in series through the resistance heater 38 and a "normally off" relay 52, actuating it to make a second circuit between a second electric power source 53 and some appropriate actuated system, of which the simplest embodiment would be an indicator light 54, located within the observer's cabin *a*. Normally such an indicator will be desired, to signal the presence of icing conditions; alternately, however, the second electrical system, actuated by the relay 52 or in other known ways, may include recorders, transducers, and other controls for miscellaneous secondary systems.

In the invention disclosed in said co-pending application, it is necessary that the masses, subject to the centrifugal force attending rotation about the hub 14, be balanced against each other. In its embodiment as shown in FIGURES 1 to 5, excess counter-balancing is provided to avoid false signals which might otherwise result from vibrations or the accretion of such minor amount of ice (as shown in dashed lines in FIGURE 2) which may be predetermined to be insignificant.

To provide for initial balance of the masses under the centrifugal forces, the housing body 32 has an aft-projecting, truncated conical portion 57, disposed diametrically opposite from the ice-accreting member 36. It terminates in an inwardly-extending, internally-threaded flange 58 which bears a heavy screw counterweight 59, adjusted radially to balance the mass of the elements projecting forwardly from the housing 31 (specifically the ice-accreting member 36 and the resistance heater 38) and then secured by a lock nut 60. Since the locus of ice accretion will for all practical purposes be the point 37 of the ice-accreting member 36, the effect of centrifugal force on the mass of accreted ice will be to overcome or over-balance the previously-counterbalanced masses and actuate the switch as heretofore described.

The leaf spring 41 provides some resistance to overbalancing which increases slightly with deflection. However, a secondary counter-weighting system was provided. This consists of an internally-threaded housing boss 62, located as hereinafter described, bearing a second adjustable screw counterweight 63 and its lock nut 64. The boss 62 is positioned at the inner side of the housing body 32, that is, on the side toward the center of rotation of the hub 14; throughout the range of angular movement of the housing 31 it remains aft of a line connecting such center with the pivot axis 20. In the embodiment shown, the angle of movement between the de-iced position shown in FIGURE 2 and the ice-accreted position shown in FIGURE 4 is only 10°. When the housing 31 is in the switch-open position shown in FIGURE 2, the angular position of the second counterweight 63 is approximately 15° aft of such connecting line. In the switch-closed position shown in FIGURE 4, it remains 5° aft of the connecting line. Since the centrifugal force on it acts outward, the moment arm of the centrifugal force on the second counterweight 63 will be reduced greatly by its movement from the position of FIGURE 2 to the position of FIGURE 4.

Summarizing said co-pending application, in the absence of accreted ice, the effect of the centrifugal force on the second counterweight 63 is to provide a predetermined extent of stability to the pivoted masses, by pressing the housing ridge 46 firmly against the stop blade 47 in the absence of a substantial accretion of ice. However, when a mass of accreted ice 61 develops moment, under centrifugal force, as to overbalance this stabilizing force, it will turn the housing 31 to the de-icing position shown in FIGURE 4, at which the effect of the second counterweight 63 is minimized. The de-icing will therefore continue without interruption until it dislodges the accreted mass, at which stage the centrifugal force applied by the counterweight 63, and aided by the restoring moment of the leaf spring 41, returns the housing 31 to its forward position, turning off the de-icer heater and de-actuating the secondary system operated by the relay 52.

Referring now to the additional drawings which show the preferred embodiment of the present invention:

FIGURE 6 is a perspective sketch showing the invention as mounted on a blade or rotating wing of a conventional helicopter.

FIGURE 7 is a top view taken along line 7—7 of FIGURE 6, the device having its top cap removed. The dashed lines indicate the accretion thereon of an amount of ice whose mass is not sufficient to actuate the device.

FIGURE 8 is a sectional view of the device taken along line 8—8 of FIGURE 7 but including the top cap, and also showing a segment of the rotor blade and a simplified schematic presentation of related portions of electrical circuitry.

FIGURE 9 is a view, similar to FIGURE 7, of the device having an accretion of ice by which it is centrifugally deflected from the FIGURE 7 position, here shown in phantom lines.

FIGURE 10 is a graphical presentation showing how the restoring moment of the pre-loading mass and of the spring vary with angular deflection from the FIGURE 7 position to the FIGURE 9 position.

The helicopter generally designated 66, shown in FIGURE 6, is of the conventional two-bladed, single rotor type. In its fuselage 67 is an engine, not shown, the power of which is supplied through the rotation of a mast 68 to a hub mechanism 69 to which are connected blade root retention fittings 70. The fittings 70 support a pair of rotor or sustaining blades 71 by their root ends, and cause the blades 71 to be driven rotatively in the sense of the arrows shown in FIGURE 6 at the blade tips 72.

A substantially vertical pivot axis 120 is established at a convenient point between the blade root retention 70 and the blade tip 72, the distance being selected to provide a typical tangential velocity at normal operating speeds of the helicopter 66. The chordwise location of the axis 120 is selected in part with a view to ease of attachment of the device hereinafter to be described, but in part to permit the point or tip 137 of the ice-accreting member, hereinafter described, to project into air flow not substantially disturbed by the passage of the blade 71.

At the position established for the axis 120 is secured, onto the upper surface of the blade 71, a mounting flange 121. Extending substantially vertically upward from the mounting flange is a hollow spindle support pivot 122, fixed within the mounting flange 121 by a mounting nut 123 as shown in FIGURE 8. A bearing, such as the ball bearing assembly 124, is mounted rotatably on the pivot 122 to permit angular movement. It is convenient to consider such movement as being substantially in plane; and this expression is used hereinafter for convenience. However, it is to be recognized that the pivot axis will be tilted over a range of several degree in normal operation of the helicopter, by coning of the blades upward, if they are of the flapping type, or by tilting of the rotor hub as a whole, if it is of the tilting type, or by cyclic pitch changes.

Through the hollow spindle of the pivot 122 are drawn the electric leads 125. From the upper end of the pivot 122, these leads 125 continue to terminals 126 secured to conductive terminal posts 127, 127', which are mounted on a fixed platform 128 keyed onto the upper end of the pivot 122, as by a snap ring 129.

Onto the outer race of the bearing 124 is mounted, by a larger snap ring 130, a rotatable housing generally designated 131. It comprises a housing body 132 of nearly cylindrical form as shown in FIGURES 7 and 9, having a lower circular flange 133 which overhangs the mounting nut 123 with clearance so as to avoid binding by the formation of ice. The upper end of the housing body 132 is equipped with a circular cap 134, shown in place in FIGURE 8 but removed in both FIGURES 7 and 9.

Projecting from the forward side of the housing body 132 is a conical-tapering, hollow, ice-accreting member 136 which has a closed, forwardly, projecting tapering point or tip 137. In normal switch-open position, it projects directly forward into the airstream encountered on rotation, that is, tangential to the hub 69, but this may be adjusted to take account of the component of wind direction due to forward movement at usual flight speeds. The wall of the hollow ice-accreting member 136 near its point 137 is sufficiently thin and heat-conductive (such as metal) as to permit de-icing by an electrical resistance heater 138 contained within it and adjacent to its point 137. The heater 138 may consist of a simple resistance wire twisted into a conical loop as shown in FIGURE 8, with one lead joining the terminal post 127, and the other lead connected to a spring-base terminal post 139, screwed or otherwise mounted onto the fixed platform 128.

Secured to the terminal post 139 by its base end 140, and extending horizontally across the platform 128 above the top of the pivot 122, is a leaf spring designated 141, formed of electrically-conductive metal. It is positioned vertically edgewise, so that it may flex in the horizontal plane and serve as the movable member of the switch mechanism herein described. It is electrically conductive from its base end 140, where it joins the terminal post 139, to its contact end 143, where it is fitted on the forward side with a bumper 144 and on its aft side with an electrical contact 145, whose movement makes and breaks the circuit hereinafter described. A vertical ridge 146 formed on the inner side of the housing body 132 and shown as semicircular, bears against the spring's bumper 144; and bends the spring 141 backward, to the slightly-flexed position shown in FIGURE 7, even when the point 137 extends straight forward. Movement of the point 137 inward of this position is prevented by contact of the ridge 146 against a limit stop blade 147 which extends radially outward from the platform 128. The flexural resistance of the spring 141 increases when, as hereinafter described, it is bent further backward as the housing 131 is moved by centrifugal force from the position shown in FIGURE 7, in which the movable electrical contact 145 is open, to the position shown in FIGURE 9, in which it is closed against a fixed electrical contact 148 supported on the terminal post 127, and having a vertical contact surface which serves as a limit stop for the ice-accreted position. The angular movement of the housing 131 is thus limited by two stops: the fixed electrical contact 148 and the stop blade 147; and these are located angularly less than 90° from each other, preferably about 10° as illustrated in FIGURE 9.

The circuitry shown in FIGURE 8 is simplified but will be clear and adequate for purposes of illustration. No reference numerals have been assigned to the electrical connector wires there diagrammed. In the control circuit, current from an electrical power source, not shown, will flow when the movable electrical contact 145 is closed against the fixed contact 148. The mechanism by which such contact is made and broken may be called the switch device. In the control circuit diagrammed is connected an indicator light 154 (which, if located in the cabin of the helicopter 66 will require rotatable connectors at the hub 69, such as familiar "slip rings" with slidable contacts, not shown), a resistor 90 in parallel with the light 154, the switch device, and a pair of normally-off relays 152 in parallel. While current flows through this control circuit, the relays 152 are energized to make their respective de-icer circuits, one in each blade. Parallel-connected blade de-ice resistance heater elements 91, shown schematically in FIGURE 8, are arranged along the entire span of the rotor blades 71, adjacent to and beneath the surface of their leading edges, to serve as de-icing means. It is to be understood that the opposite rotor blade, not shown in FIGURE 8, is similarly equipped, and that such slip ring connectors at the hub 69 are used in the de-icing circuits as well as in the control circuit. Such helicopter hub slip ring arrangements do not constitute the present invention; and are so familiar and obvious, and their precise deails so readily varied to suit particular conditions, that no purpose would be served by illustrating them in detail.

To provide for balance of the masses under the centrifugal forces in the absence of accreted ice, the housing body 132 has an aft-projecting, truncated conical portion 157, disposed diametrically opposite from the ice-accreting member 136. It terminates in an inwardly-extending, internally-threaded flange 158 which bears a heavy screw counterweight 159, adjusted radially to balance precisely the mass of the elements projecting forwardly from the housing 131 (specifically the ice-accreting member 136 and the resistance heater 138) and then secured by a lock nut 160.

Obviously, the device should not be so delicate in its operation as to be actuated by minute accretions of ice, or other occasional or random unbalancing forces. To avoid such a result, I provide on the fixed platform 128 a second axis 75 which is parallel to but aft of the vertical support pivot axis 120; and I pivotally mount on the axis 75 a novel control, which I herein refer to as a pre-loading mass, generally designated 76. The mass 76 is preferably formed of one of the heavier metals, as a relatively thick, somewhat elongated, curving block, having at its forward rounded end a vertical bore 77 which pivots on a vertical pivot pin 78 mounted on the fixed platform 128 concentric with the axis 75. Near its aft, free end, the side of the pre-loading mass 76 outwardly from the hub 69 has a smooth face referred to as the bearing face 79. The center of gravity of the pre-loading mass 76 lies somewhere between the bearing face 79 and the vertical bore 77. The bearing face 79 is presented against a second semi-circular ridge 80 integral with and projecting inwardly from the inner surface of the housing 131. It is similar to the semi-circular ridge 146 but located nearly diametrically opposite to the ice-accreting member 136. Centrifugal force on the pre-loading mass 76 is reacted in part at the pivot pin 78 and in part at its bearing face 79. This latter portion urges the mass 76 to swing radially outward behind the pivot pin 78 and bear against the ridge 80, thus applying to the housing 131 a twisting moment. It thus serves to pre-load the device by applying a moment which is the function of the mass 76, which moment will precisely offset the centrifugal force imposed by the presence on the point of the ice-accreting member 136 of a predetermined mass of accreted ice. Rotor accelerations and decelerations change the magnitude of these forces proportionately and will not affect their offsetting each other.

Should the amount of ice accrete beyond such a predetermined amount to the quantity shown in FIGURE 9, the centrifugal force of its mass will move the device angularly to the overbalanced FIGURE 9 position. In such FIGURE 9 position, the semi-circular ridge 80 presses the bearing face 79 radially inward, thus pivoting the pre-loading mass about its vertical pivot pin 78. The center of gravity of the pre-loading mass 76, originally being offset substantially aft of the pivot pin 78, is so moved by the angular movement of the housing that its aft offset is lessened; a larger part of its centrifugal force will be reacted at the pivot pin 78. Consequently, its offsetting moment will be decreased and the moving contact 145 will snap closed against the fixed contact 148. With the fixed electrical contact 148 serving as a limit stop, the semi-circular ridge 80 cannot escape beyond the bearing face 79. Hence centrifugal force of the pre-loading mass 76 will continue to urge the housing 131 toward the switch-open position, but with a substantially lessened force.

FIGURE 10 is a graph showing, among other things, the variation of this resisting or restoring moment, applied by the pre-loading mass 76, with angular deflection of the housing 131. At zero deflection, that is, in the normal or switch-open position, the restoring or resisting moment applied by the centrifugal force acting on the pre-loading mass 76, is at a maximum; it diminishes greatly as the angular deflection of the housing to the 10° switch-closed or signal position is reached. In contrast, the restoring moment applied by the leaf spring 140 increases slightly from the normal or 0° position to the switch-closed or signal position at 10° angular deflection. Because of the relatively great length of the leaf spring 140, the increase in its restoring force accompanying deflection is minimized; this increase is more than offset by the very substantial decrease of the restoring moment applied by the pre-loading mass 76. Hence, once the de-icing circuits have been energized by the accretion of ice beyond the mass shown in FIGURE 7, they will continue to be energized until the ice is either completely dislodged or melted to an immaterial amount, substantially less than the predetermined amount required to actuate the device in the first instance.

It would be undesirable to permit the switch device to swing from open to closed during ground handling. To prevent such swinging, a centrifugal latch mechanism is provided. This consists of a heavy metal pivot latch member generally designated 82 which is somewhat crescent or horseshoe-shaped, having an end 84 radially outward of the pivot pin 78 and pivot-mounted on a vertical latch pivot 84' which rises from the fixed platform 128, a free inward end 86 which extends radially inward of the pivoted end of the pre-loading mass 76, and a concave aft-presented side 83 which lies curvingly forward of the forward end of the pre-loading mass 76. The center of gravity of the latch lies well forward of its pivoted end 84. When the latch member 82 is closed, it assumes the aft position shown in dashed lines in FIGURE 8, with its concave side surface 83 embracing the pivoted end of the pre-loading mass 76 and its free inward end 86 bearing against the inward side of the mass 76, to interfere with its turning on its pivot pin 78. A latch spring 87, connected in tension between the body of the latch 82 and an inwardly-located spring-holder pin 88, actuates the latch 82 into such position, but its tension force is subject to being offset by centrifugal forces acting on the crescent-shaped mass of the pivot latch 82. FIGURE 9 shows the latch 82 is disengaged from the preloading mass 76, as under such centrifugal force.

Summarizing the present invention, the helicopter rotor system itself serves as means which carries the spindle pivot 122 in a curved path substantially in a plane which is out of coincidence with the axis of the pivot 122. Both the pre-loading mass 76 and the leaf spring 140 combine to constitute yieldable means urging the ice-accreting member 136 to assume a forward-projecting position with respect to such curved path. The electrical circuit described is operated by angular deviation of the device from such forwardly presented position. The indicator light 154 serves as means to signal to the operator of the helicopter that angular movement of the ice-accreting means has taken place; that is, that atmospheric icing conditions are of such severity as to cause the device to operate. The light signal will continue until de-icing of the ice-accreting member 136 is substantially complete. If the de-icing capacity of its heater 138 is suitably balanced against the de-icing capacity of the blade de-icer heaters 91, the flashing-off of the indicator signal light 154 will relieve the pilot of concern about ice on the rotor blades.

However, even if no blade de-icing is provided, the device has utility. When it flashes off, the ice-accreting member 136 has been de-iced. It will flash on again as soon as new ice has accreted in quantity sufficient to actuate the device. The rate at which such cycles are repeated indicates the severity of icing conditions of the atmosphere. For the simple indicator light 154, recording or integrating instruments may be substituted; likewise, other means may be used to interpret or supplement the signals from such control circuit. Other types of electrical circuits may be added to the system so operated by the centrifugal switch device.

While I have described and shown a taper-pointed ice-collecting member, the function of collecting ice at a predetermined locus of ice accretion may be served by bodies of somewhat different shape. For example, there might be substituted in some installations a cylindrical body whose axis was aligned with the relative wind, having a blunt forward end incorporating a de-icing element. In addition to ice-accreting characteristics, the aerodynamic aspects sought may indicate the desirability of varying the shape of the device. For continued use in extreme conditions, additional areas of the housing may be provided with de-icing heaters. Positive switch operation by an unbalance of centrifugal forces dictates the limitation of angular movement to within one quadrant, that is, it should not exceed 90°; but substantial variation of angular range may be provided. Other modifications in the construction and use of the present disclosure will be apparent when the particular engineering problems of a given situation are considered. Accordingly, this invention should not be construed narrowly but instead as fully co-extensive with the claims which follow.

I claim:

1. For aircraft of the type including a sustaining blade rotating about a hub, a device responsive to the accretion of ice, comprising a vertical support pivot having a mounting whereby it may be secured to such blade, a pivoted housing mounted for angular movement about the vertical pivot, stops limiting such angular movement to less than 90° and establishing at the one limit a normal position and at the other an ice-accreted position, a tapering ice-accreting member projecting from the housing and normally presented forward of the hub, masses subject to centrifugal forces attending rotation about the hub, said masses including the housing and its ice-accreting member and being positioned and weighted for centrifugal balance about the pivot in the normal position in the absence of accreted ice, a switch having a fixed contact adjacent to the limit stop for the ice-accreted position and having a movable contact borne by angular movement of the housing from the normal position to the ice-accreted position, a source of electricity, and an electrical system operatively connected to said source of electricity and controlled by the switch, together further with a pre-loading mass pivoted on an axis parallel to the vertical support pivot, the pre-loading mass having a free end bearing against the housing aft of the support pivot, whereby to apply to it a twisting moment to offset the centrifugal force imposed by the presence of ice on the ice-accreting member.

2. The combination as defined in claim 1, the center of gravity of said pre-loading mass being offset aft of its said pivot axis, such offset being lessened by angular movement of the housing, whereby its offsetting force lessens as the device pivots on its support pivot.

3. The combination as defined in claim 2, further having a pivoted latch, spring-urged radially inward with respect to the rotor blade to bar movement of the free end of the pre-loading mass, the latch having a pivot, the center of gravity of the latch mass being offset forwardly from its pivot, whereby centrifugal force acting upon the latch mass offsets the spring urging and withdraws the latch from the pre-loading mass.

4. A de-icer device for aircraft and the like, comprising a pivot, means to carry the pivot along a curved path in a plane out of coincidence with the pivot axis, an ice-accreting member mounted on said pivot and balanced thereon against centrifugal forces, yieldable means urging said member to assume a forwardly presented position respect to such curved path, electrical circuit means operated by deviation of the device from a forwardly presented position, and, in circuit therewith, an electrical de-icing heater within the ice-accreting member.

5. In combination with a rotating arm, a switch device responsive to a pre-determined magnitude of unbalancing force but independent of change in velocity of rotation, comprising a mounting carried by the arm in a curved path generally in the plane and including a pivot permitting angular movement in the plane, a housing mounted on the pivot, means projecting from the housing and spaced from the pivot to receive an unbalancing force, the said housing and projecting means being counterbalanced about the pivot against centrifugal forces resulting from movement of the arm along the curved path in the absence of such unbalancing force, a switch within the housing having a contact moving with the housing angularly about the pivot to establish an open position and a closed position, one of said switch positions being an undeflected position and the other position being that assumed when an unbalancing force deflects the projecting means angularly about the pivot, together further with a pre-loading mass bearing resistingly against the housing to urge it angularly with a turning moment which, in the undeflected position, is opposite and equal to the turning moment of an unbalancing force of such pre-determined magnitude.

6. A device for rotary wing aircraft, said device being of the type having an ice-accreting member projecting in the direction of travel of the rotating wing, characterized in that the device includes a vertical pivot mounted onto the rotating wing outwardly of its center of rotation, and the ice-accreting member is balanced on the pivot against centrifugal forces, and that the pivot is aft of the locus of ice accretion on said member, and said device contains an electrical circuit-making means actuated by angular movement of the ice-accreting member responsive to the centrifugal force of accreted ice, further characterized in having a pre-loading mass carried by the rotating wing but not pivoted on the pivot, which mass is centrifugally actuated to bear against the ice-accreting member in opposition to the mass of accreting ice.

7. A device for rotary wing aircraft, said device being of the type having an ice-accreting member projecting in the direction of travel of the rotating wing, characterized in that the device includes a vertical pivot mounted onto the rotating wing outwardly of its center of rotation, and the ice-accreting member is balanced on the pivot against centrifugal forces, and that the pivot is aft of the locus of ice accretion on said member, and said device contains an electrical circuit-making means actuated by angular movement of the ice-accreting member responsive to the centrifugal force of accreted ice, further characterized in having a latch means of substantial mass, said latch means engaging between the member so balanced on the pivot and a portion not so balanced to prevent angular movement and disengaging when the wing is rotating under the centrifugal force of its own mass.

References Cited in the file of this patent

UNITED STATES PATENTS

| 2,566,813 | Thorsen | Sept. 4, 1951 |
| 2,820,958 | Fraser | Jan. 21, 1958 |

FOREIGN PATENTS

| 662,110 | Great Britain | Nov. 28, 1951 |